United States Patent
Anderson et al.

(10) Patent No.: US 7,339,946 B2
(45) Date of Patent: Mar. 4, 2008

(54) METHOD OF EFFICIENTLY DETECTING A LOSS OF GRANTED BANDWIDTH

(75) Inventors: Jeffrey S. Anderson, Itasca, IL (US); Hemant Patel, Palatine, IL (US); Michael C. Petrie, Hoffman Estates, IL (US); David M. Rzonca, Phoenix, AZ (US); Carl M. Willis, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 847 days.

(21) Appl. No.: 10/717,757

(22) Filed: Nov. 20, 2003

(65) Prior Publication Data
US 2005/0111423 A1    May 26, 2005

(51) Int. Cl.
*H04B 7/212* (2006.01)
*H04J 3/16* (2006.01)
*H04L 12/28* (2006.01)
*H04L 12/56* (2006.01)

(52) U.S. Cl. ............... 370/443; 370/468; 370/431; 370/395.4; 370/395.41

(58) Field of Classification Search ............ 370/443, 370/431, 442, 458, 465, 468, 395.4, 395.41
See application file for complete search history.

(56) References Cited

U.S. PATENT DOCUMENTS

| | | | | | |
|---|---|---|---|---|---|
| 5,172,375 | A | * | 12/1992 | Kou | 370/322 |
| 6,366,761 | B1 | * | 4/2002 | Montpetit | 455/12.1 |
| 6,594,245 | B1 | * | 7/2003 | Rimhagen et al. | 370/337 |
| 2003/0195965 | A1 | * | 10/2003 | Choi et al. | 709/227 |

* cited by examiner

*Primary Examiner*—George Eng
*Assistant Examiner*—Un C. Cho
(74) *Attorney, Agent, or Firm*—Terri S. Hughes (57) ABSTRACT

A subscriber unit (100) determines that there is information to transmit, and requests an amount of bandwidth. Upon receipt of the request for bandwidth from the subscriber unit, the fixed network equipment (FNE; 102) determines whether the requested bandwidth is available. If yes, the FNE dynamically determines at least a first timer value to be used by the subscriber unit to detect a loss of granted bandwidth, and transmits a reservation grant to the subscriber unit granting the request. The reservation grant comprises the at least first timer value. Upon receipt of the reservation grant, the subscriber unit extracts the at least first timer value from the reservation grant and uses the at least first timer value to detect loss of granted bandwidth.

18 Claims, 7 Drawing Sheets

FIG. 8

METHOD OF EFFICIENTLY DETECTING A LOSS OF GRANTED BANDWIDTH

REFERENCE TO RELATED APPLICATION

The present application is related to the following U.S. application Ser. No. 10/166,836, filed Jun. 11, 2002, titled "Method for Assigning Inbound Transmissions with Minimal Signaling Overhead" by Conrad et al., which is commonly owned together with this application by Motorola, Inc.

FIELD OF THE INVENTION

The present invention relates generally to a method for subscriber units to efficiently detect the loss of granted bandwidth from fixed network equipment ("FNE"), with minimal signaling overhead.

BACKGROUND OF THE INVENTION

Figure 1:
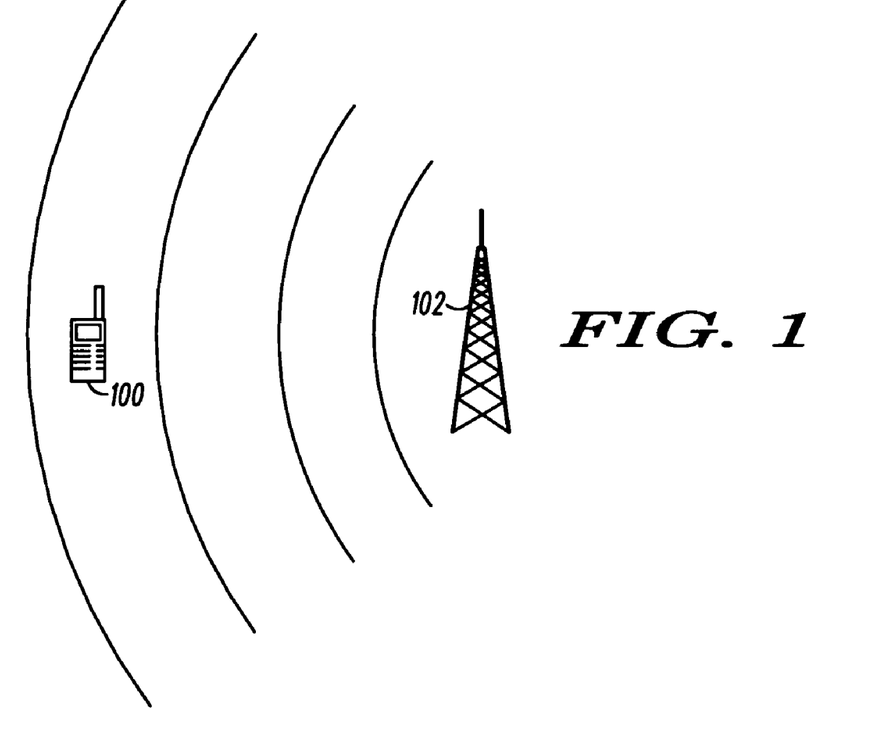
FIG. 1 illustrates a system diagram comprising the subscriber unit and the FNE.
Figure 2:
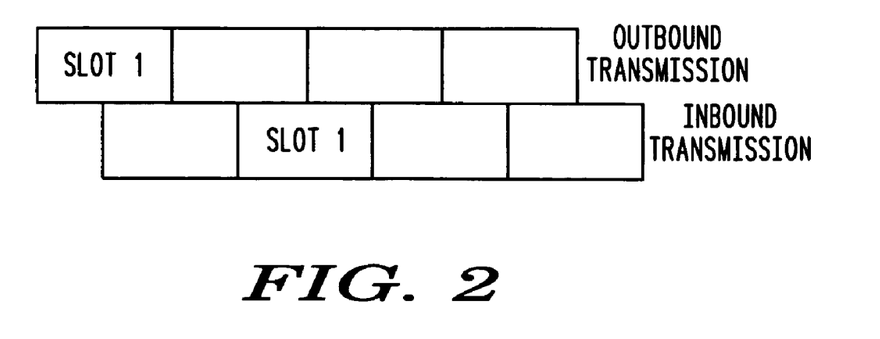
FIG. 2 illustrates outbound time slot 1 with its corresponding inbound slot 1.

In a time division multiple access system, inbound channel bandwidth can be negotiated and assigned dynamically between a subscriber unit 100 and the FNE 102 as illustrated in FIG. 1. Furthermore, after the FNE 102 has granted inbound channel bandwidth, inbound slot assignments for the subscriber unit 100 can be made on each corresponding outbound slot by the FNE 102. As illustrated in FIG. 2, outbound slot 1 would contain a subscriber assignment identifier that specifies the slot assignment of inbound slot 1. However, due to radio frequency ("RF") induced errors on the outbound channel, or due to the FNE 102 not honoring its negotiated inbound channel bandwidth reservation with the subscriber unit 100, the subscriber unit 100 may not receive all granted slot assignments.

Thus, there exists a need for a method that allows a subscriber unit 100 to efficiently detect the loss of granted bandwidth, with minimal signaling overhead, in a timely manner.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention allows the FNE 102 to dynamically determine at least one timeout timer value, and other reservation parameters, (preferably based on current conditions) for a subscriber unit 100 assigned to transmit in a plurality of inbound slots. The timeout timer value may be based on, but is not limited to, local network/channel loading conditions, requested or assigned priority levels, and/or requested or assigned quality of service ("QoS") arguments, at the time the FNE 102 receives the request for bandwidth from the subscriber unit 100. In accordance with the present invention, the FNE 102 is permitted to assign inbound slots to the subscriber unit 100 in a non-deterministic fashion. In return, the subscriber unit 100 utilizes at least one timeout timer value to detect when the FNE 102 has stopped granting negotiated slot assignments, and takes corrective actions (e.g., immediately requesting additional bandwidth, requesting additional bandwidth after a delay, or the like) to complete its transmission of information (e.g., user data, signaling information, etc.) or fails the current reservation. Let us now discuss the present invention in detail.

First, let us discuss reservation management procedures in accordance with the present invention. In a FNE configuration, a reservation-based approach is utilized to gain access to reserved access slots on the inbound channel. This permits a relatively large population of subscriber units to be efficiently served on a priority basis by a relatively small number of slots. Subscriber units 100 contend on the random access channel to request reserved access bandwidth from the FNE 102. The FNE 102 takes the requests and schedules the transmissions of subscriber units 100 on reserved access slots on the inbound channel that do not experience contention. The scheduling algorithm may be tailored to specific system applications, as readily known to those individuals ordinarily skilled in the art, and its implementation is beyond the scope of the present invention.

Reservation management is supported through either slot-based or block-based bandwidth arguments. Slot-based or block-based bandwidth arguments permit a flexible way to manage channel utilization for subscriber units 100 that may have either half or full duplex radio channel capability. Typically, the subscriber unit 100 and the FNE 102 support slot-based reservations, and may support block-based reservations. The subscriber unit 100 may be manually provisioned to utilize slot-based or block-based reservations, or the subscriber unit 100 may first attempt to implement a block-based reservation, and then resort back to a slot-based reservation if the FNE 102 rejects the block-based reservation as not being supported.

Reservation management is a serial process for the subscriber unit 100. The subscriber unit 100 only has a single outstanding reservation request attempt in progress. The subscriber unit 100 has the ability to cancel an active reservation at any time. The FNE 102 is permitted to direct the subscriber unit 100 to another channel at the site to grant the negotiated bandwidth at any time.

Figure 3:
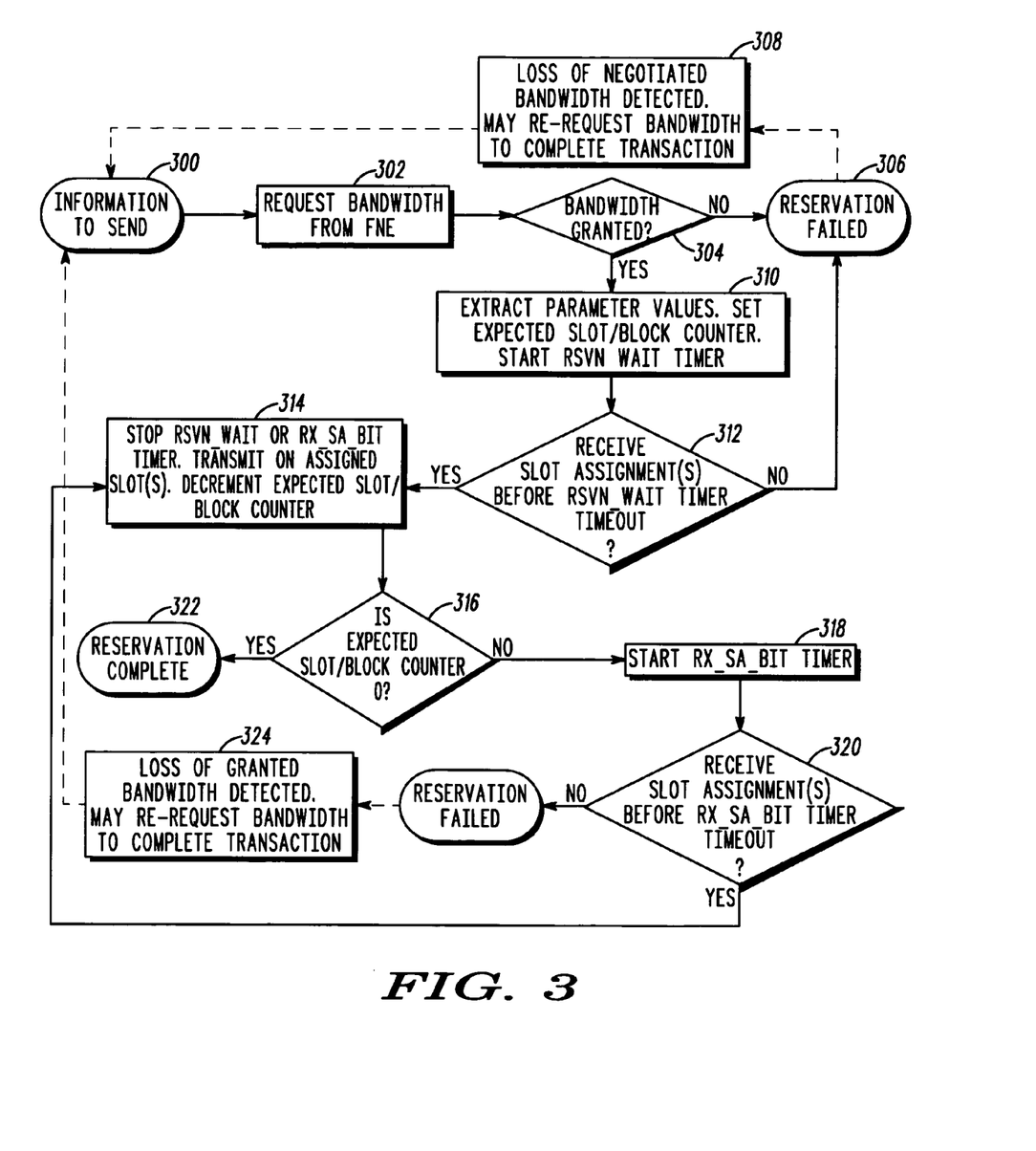
FIG. 3 illustrates a logic flow diagram from the perspective of the subscriber unit in accordance with the present invention.

From the perspective of the subscriber unit 100 as illustrated in FIG. 3, when the subscriber unit 100 has information to transmit to the FNE 102, it first calculates the number of slots/blocks that are required to transmit the information (step 300). There are numerous algorithms known to individuals ordinarily skilled in the art in which the subscriber unit 100 may use to calculate the number of slots/blocks required to transmit the information (e.g., a radio link adaptation (RLA) algorithm). The subscriber unit 100 then forms a request for the desired bandwidth and transmits the request to the FNE 102 over the air interface (step 302).

In the preferred embodiment of the present invention, if the subscriber unit 100 receives a reservation decline from the FNE 102 denying the request for bandwidth (step 304), the subscriber unit 100 fails the reservation attempt and transitions to an idle state (step 306); in the preferred embodiment, the subscriber unit 100 may re-transmit the request for bandwidth after some delay (step 308).

If, however, the subscriber unit 100 receives a reservation grant from the FNE 102 granting the request for bandwidth (step 304), the subscriber unit 100 extracts the reservation parameters from the response (i.e., timeout timer value(s), the number of slots/blocks granted, etc.); based on the reservation parameters, the subscriber unit 100 starts a reservation wait timer, and sets an expected slot/block counter (step 310). The reservation wait timer informs the subscriber unit 100 of the amount of time it shall wait to receive the first slot assignment ("SA") bit(s) from the FNE 102 before determining a loss of granted bandwidth. It shall be noted that even though the reservation wait timer is a feature in the preferred embodiment of the present invention, it should be considered as an optional feature of the present invention.

If the subscriber unit 100 does not receive its first SA bit relating to the current reservation prior to the expiration of the reservation wait timer (step 312), the subscriber unit 100 fails the current reservation and transitions to the idle state (step 306); the subscriber unit 100 may re-transmit the request for bandwidth after a predetermined period of time has lapsed (step 308).

If the subscriber unit 100, however, receives its first SA bit relating to the current reservation for bandwidth prior to the expiration of the reservation wait timer (step 312), the subscriber unit 100 stops the reservation wait timer, transmits information on the assigned slot and decrements its expected slot/block counter (step 314). After the subscriber unit 100 decrements the expected slot/block counter, if the value of the expected slot/block counter is greater than zero (step 316), the subscriber unit 100 starts a receive SA bit timer based on the reservation parameters previously received from the FNE 102 in the reservation grant (step 318). The receive SA bit timer informs the subscriber unit 100 of the amount of time it shall wait to receive the next SA bit(s) from the FNE 102 before determining a loss of granted bandwidth.

If the subscriber unit 100 receives a subsequent SA bit(s) before the expiration of the receive SA bit timer (step 320), the subscriber unit 100 transmits information on the assigned reserved access slot, and decrements the expected slot/block counter (step 314); the subscriber unit 100 decrements the expected slot/block counter and starts the receive SA bit timer after transmission on every reserved access slot. The subscriber unit 100 continues to loop through steps 314-320 until the value of the expected slot/block counter is decremented to zero (step 316) or the subscriber unit 100 does not receive a subsequent SA bit(s) prior to the expiration of the receive SA bit timer (step 320). When the value of the expected slot/block counter is decremented to zero (step 316), the subscriber unit 100 concludes that the current reservation is complete (step 322). When the subscriber unit 100 does not receive a subsequent SA bit(s) from the FNE 102 prior to the expiration of the receive SA bit timer (at step 320), the subscriber unit 100 efficiently detects that there has been a loss of granted bandwidth with the FNE 102 and may fail the current reservation (step 324) or may re-request bandwidth from the FNE 102 to complete the transfer of information (step 300).

It is important to note that the subscriber unit 100 may accumulate additional information to transmit to the FNE 102 that requires additional bandwidth than that granted in the current reservation. When this is the case, the subscriber unit 100 may send a new request for additional bandwidth to the FNE 102 on any reserved access slot of the current reservation. In this instance, when requesting the additional bandwidth, the subscriber unit 100 takes into account that it may have to add a slot/block to the request because it "stole" bandwidth from the current reservation. If the subscriber unit 100 receives a reservation grant from the FNE 102 granting the new request, it extracts the new reservation parameters from the response, updates the expected slot/block counter, re-initializes the timeout timer value(s), if necessary, and continues the process as described above in FIG. 3. If, however, the subscriber unit 100 receives a reservation decline from the FNE 102 denying the new request, the subscriber unit 100 fails the newly requested reservation and continues with the current active reservation; the subscriber unit 100 may re-transmit a request for bandwidth for the additional information after some delay, if necessary.

Figure 4:
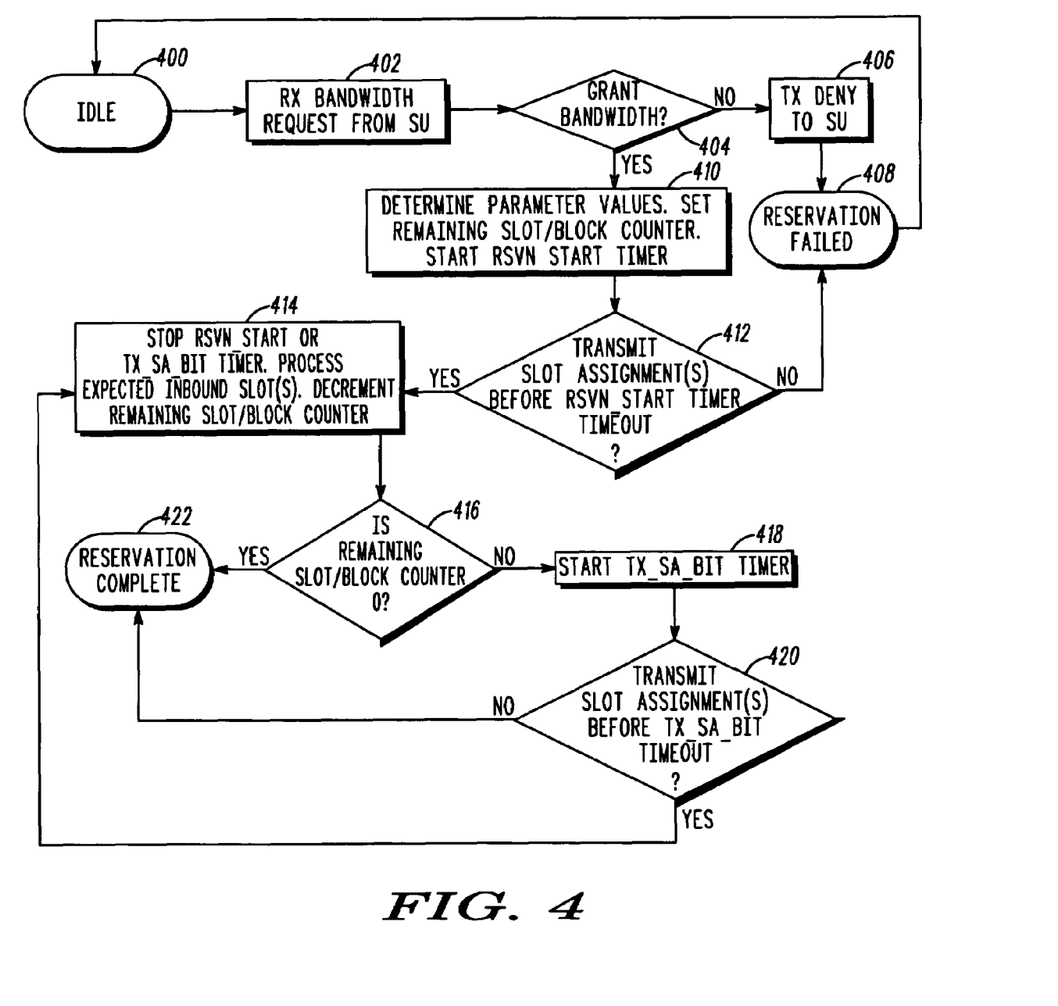
FIG. 4 illustrates a logic flow diagram from the perspective of the FNE in accordance with the present invention.

From the perspective of the FNE 102 as illustrated in FIG. 4, the FNE 102 remains in an idle state until receipt of a request for bandwidth from a subscriber unit 100 (step 400). Upon receipt of a request for bandwidth (step 402), the FNE 102 determines whether the request is valid, and whether there is a sufficient amount of bandwidth available on the inbound channel (e.g., via an admission control algorithm) to support the request (step 404). If the FNE 102 determines that the request is invalid and/or a sufficient amount of bandwidth is not currently available on the inbound channel to support the request, then the FNE 102 transmits a reservation decline to the subscriber unit 100 denying the request (step 406), and fails the reservation attempt (step 408).

If, however, the FNE 102 determines that the request is valid and that there is a sufficient amount of bandwidth on the channel to support the request (step 404), the FNE 102 determines the reservation parameters (e.g., the timeout timer values, the number of slots/blocks granted, etc.), starts a reservation start timer, sets a remaining slot/block counter (starting with the number of slots/blocks granted), and transmits a reservation grant to the subscriber unit 100 granting the request comprising the reservation parameters (step 410). The reservation parameters may be based on, but is not limited to, the current loading and/or RF conditions of the inbound channel, requested or assigned priority levels, and/or requested or assigned QoS arguments, at the time the FNE 102 received the request for bandwidth from the subscriber unit 100. The reservation start timer informs the FNE 102 of the amount of time it has before it transmits the first SA bit(s) in the current reservation to the subscriber unit 100.

If the FNE 102 is unable to transmit the first SA bit(s) in the current reservation prior to the expiration on the reservation start timer (step 412), the FNE 102 fails/drops the current reservation and the processing is complete (step 408). The FNE 102 may be unable to transmit the first SA bit(s) for a variety of reason, including, but not limited to, system conditions, such as, channel RF conditions and/or loading conditions, receipt of a preemptive reservation, or the like. If, however, the FNE 102 does transmit the first SA bit(s) in the current reservation prior to the expiration of the reservation start timer (step 412), the FNE 102 decrements the remaining slot/block counter (step 414). Typically, upon transmission of a SA bit(s), the FNE 102 waits to receive information on the inbound channel from the subscriber unit 100.

After decrementing the remaining slot/block counter (step 414), the FNE 102 determines whether the value of the remaining slot/block counter is equal to or greater than zero (step 416). If the value of the remaining slot/block counter is greater than zero, the FNE 102 starts a transmit SA bit timer (step 418), and intends on transmitting a subsequent SA bit(s) to the subscriber unit 100 prior to the expiration of the transmit SA bit timer (step 420). The FNE 102 loops through steps 414-420 until the remaining slot/block counter is decremented to zero (step 416), in which case, the FNE 102 concludes that the reservation is complete (step 422), or until the FNE 102 is unable to transmit a subsequent SA bit(s) prior to the expiration of the transmit SA bit timer (step 420), in which case, the FNE 102 drops the current reservation (step 422).

If the FNE 102 receives an additional request from the subscriber unit 100 for additional bandwidth, the FNE 102 first determines whether the request is valid, and whether the inbound channel can support the additional bandwidth. If the request is determined to be invalid and/or bandwidth is not currently available on the inbound channel, then the FNE 102 transmits a reservation decline to the subscriber unit 100 denying the request. If, however, the request is valid and additional bandwidth is available on the inbound channel, then the FNE 102 determines new reservation parameters (preferably based on current conditions at the time the FNE 102 received the new request) and transmits a reservation grant to the subscriber unit 100 granting the new request comprising the new reservation parameters. The FNE 102 then updates the remaining slot/block counter for that subscriber unit 100, re-initializes the timeout timer value(s), if necessary, and continues the process as described above in FIG. 4.

Figure 5:
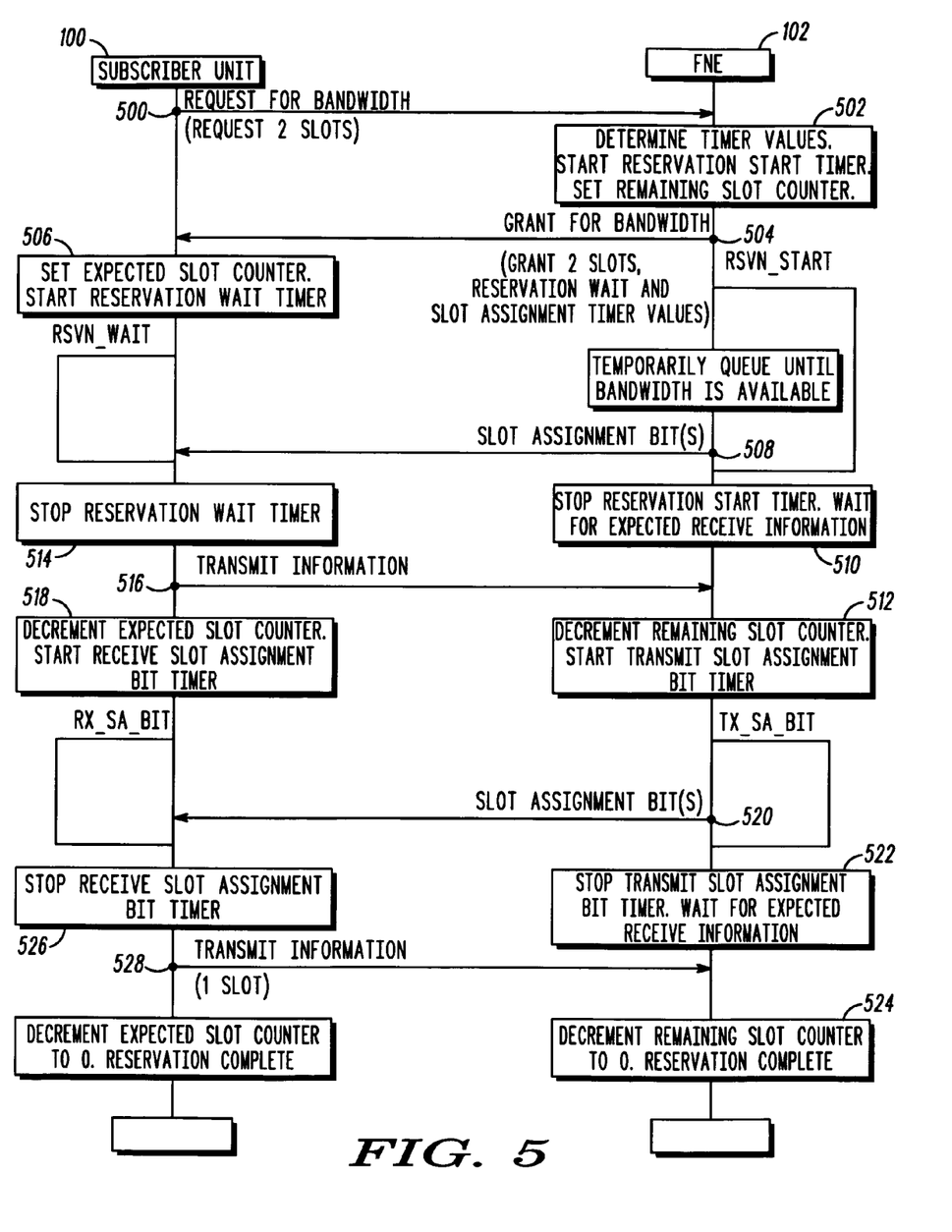
FIG. 5 illustrates a first example of a message flow diagram for a slot-based reservation between the subscriber unit and the FNE in accordance with the present invention.

Referring now to two examples of slot-based reservation management operation in accordance with the present invention. FIG. 5 illustrates a first example of a message sequence chart diagram implementing the present invention using slot-based reservations. In this example, the subscriber unit 100 desires to transmit information to the FNE 102, and determines that it needs two slots to transmit the information in its buffer. As a result, the subscriber unit 100 transmits a bandwidth request to the FNE 102, requesting the two slots (step 500). In this example, upon receipt of the request, the FNE 102 determines that there is a sufficient amount of bandwidth available on the channel to support the request, dynamically determines appropriate timeout timer values and other reservation parameters, starts its reservation start timer (depicted as RSVN_Start in the figures) and sets its remaining slot counter to two (step 502). The FNE 102 transmits a reservation grant to the subscriber unit 100 granting the request and communicating the reservation parameters for the current reservation to be used by the subscriber unit 100 (step 504). Upon receipt of the reservation grant, the subscriber unit 100 sets its expected slot counter to two, starts its reservation wait timer (depicted as RSVN_Wait in the figures) based on the value received in the reservation grant (e.g., 200 ms), and waits to receive its first SA bit(s) from the FNE 102 for the current reservation (step 506).

In this example, when bandwidth becomes available on the inbound channel, the FNE 102 transmits the first SA bit in the current reservation for the subscriber unit 100 prior to the expiration of its reservation start timer (step 508). Upon transmission of the first SA bit, the FNE 102 stops the reservation start timer, and optionally waits for expected receive information from the subscriber unit 100 on the assigned reserved access slot (step 510). If the FNE 102 is implementing the optional wait feature in a slot-based reservation, the FNE 102 waits until the reserved access slot identified in the SA bit passes before it decrements the remaining slot counter to one; otherwise, the FNE 102 may decrement the counter any time after the transmission of the SA bit. The FNE 102 then starts the transmit SA bit timer after the last assigned inbound reserved access slot time has been passed (step 512).

Upon receipt of the first SA bit from the FNE 102, the subscriber unit 100 stops the reservation wait timer (step 514), and transmits information in the reserved access slot identified from the SA bit(s) (step 516). After the subscriber unit 100 transmits its information in the reserved access slot, the subscriber unit 100 decrements its expected slot counter to one, and starts the receive SA bit timer based on the value received in the reservation grant previously received for the current reservation from the FNE 102 (e.g., 100 ms; step 518).

The FNE 102 then transmits the next SA bit to the subscriber unit 100 prior to the expiration of the transmit SA bit timer (step 520). Once the next SA bit is transmitted, the FNE stops its transmit SA bit timer, and optionally waits for expected receive information from the subscriber unit 100 on the assigned reserved access slot (step 522). Again, if the FNE 102 is implementing the optional wait feature, the FNE 102 waits until the reserved access slot identified in the SA bit passes before it decrements its remaining slot counter to zero, and concludes that the current reservation is complete; otherwise, it merely decrements its remaining slot counter and concludes that the current reservation is complete any time after the transmission of the SA bit (step 524).

Upon receipt of the next SA bit, the subscriber unit 100 stops its receive SA bit timer (step 526), and transmits its remaining information in the reserved access slot identified from the SA bit (step 528). The subscriber unit decrements its expected slot counter to zero, and concludes that the current reservation is complete (step 530).

Figure 6:
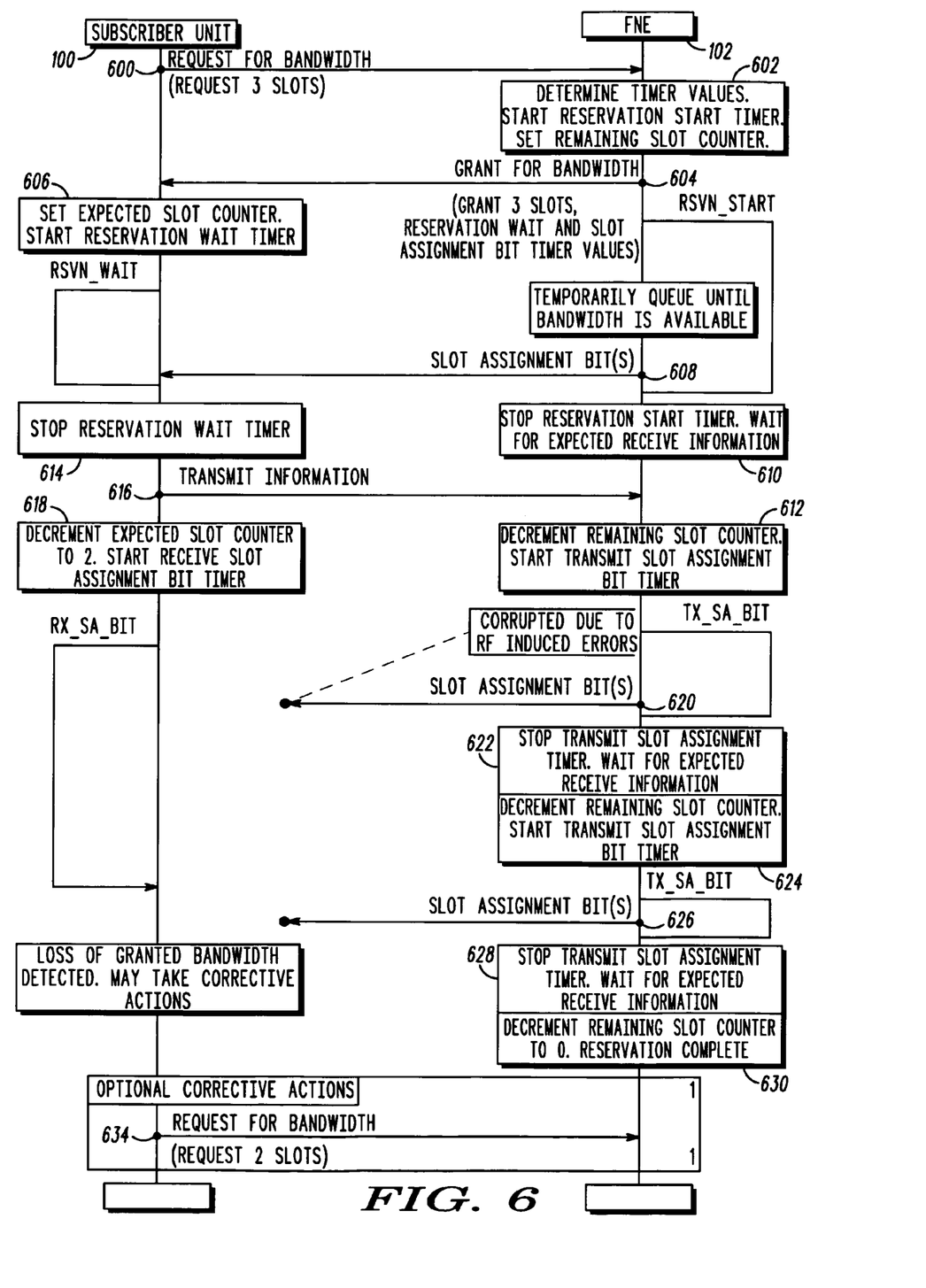
FIG. 6 illustrates a second example of a message flow diagram for a slot-based reservation between the subscriber unit and the FNE in accordance with the present invention.

Referring now to a second example of slot-based reservations in accordance with the present invention; in this example, the subscriber unit 100 does not receive all of the granted bandwidth from the FNE 102. As illustrated in FIG. 6, the subscriber unit 100 desires to transmit information to the FNE 102, and determines that it needs three slots to transmit the information in its buffer. As a result, the subscriber unit 100 transmits a bandwidth request to the FNE 102, requesting three slots (step 600). In this example, upon receipt of the request, the FNE 102 determines that there is a sufficient amount of bandwidth available on the channel to support the request, dynamically determines appropriate timeout timer values and other reservation parameters, starts its reservation start timer, and sets its remaining slot counter to three (step 602). The FNE then transmits a reservation grant to the subscriber unit 100 granting the request and communicating the reservation parameters to be used by the subscriber unit 100 (step 604). Upon receipt of the reservation grant, the subscriber unit 100 sets its expected slot counter value to three, starts its reservation wait timer based on the value received in the reservation grant (e.g., 300 ms), and waits to receive its first SA bit(s) in the current reservation from the FNE 102 (step 606).

In this example, when the bandwidth becomes available on the inbound channel, the FNE 102 transmits the first SA bit in the current reservation for the subscriber unit 100 prior to the expiration of its reservation start timer (step 608). Upon transmission of the first SA bit, the FNE 102 stops its reservation start timer, and optionally waits for expected receive information from the subscriber unit 100 on the assigned reserved access slot (step 610). Again, if the FNE 102 is implementing the optional wait feature, the FNE 102 waits until the reserved access slot identified in the SA bit passes before it decrements the remaining slot counter to two; otherwise, the FNE 102 may decrement its remaining slot counter any time after the transmission of the SA bit. The FNE 102 then starts its transmit SA bit timer after the last assigned inbound reserved access slot time has been passed (step 612).

Upon receipt of the first SA bit from the FNE 102, the subscriber unit 100 stops its reservation wait timer (step 614), and transmits information in the reserved access slot identified from the SA bit(s) (step 616). After the subscriber unit 100 transmits information in the last assigned inbound reserved access slot, the subscriber unit 100 decrements its expected slot counter to two and starts its SA bit timer based on the value previously received in the reservation grant from the FNE 102 (e.g., 200 ms; step 618).

The FNE 102 then transmits the next SA bit to the subscriber unit 100 prior to the expiration of the transmit SA bit timer (step 620). Upon transmission of the SA bit, the FNE stops its transmit SA bit timer, and optionally waits for expected receive information from the subscriber unit 100 on the assigned reserved access slot as described above (step 622). After the assigned reserved access slot identified in the SA bit passes, the FNE 102 decrements its remaining slot counter to one, and starts its transmit SA bit timer (step 624). The subscriber unit 100 did not receive this SA bit from the FNE 102 because the SA bit was corrupted due to RF-induced errors. As such, the subscriber unit 100 continues to wait to receive a SA bit from the FNE 102.

The FNE 102 then transmits another SA bit to the subscriber unit prior to the expiration of its transmit SA bit timer (step 626). Upon transmission of the SA bit, the FNE stops its transmit SA bit timer, and optionally waits for expected receive information from the subscriber unit 100 on the assigned reserved access slot as described above (step 628). After the assigned reserved access slot identified in the SA bit passes, the FNE 102 decrements its remaining slot counter to zero, and concludes that the current reservation is completed (step 628).

Again, the subscriber unit 100 did not receive the SA bit from the FNE 102 because the SA bit was corrupted due to RF-induced errors. Again, the subscriber unit 100 continues to wait to receive a SA bit from the FNE 102 prior to the expiration of its receive SA bit timer. In this example, the subscriber did not receive a SA bit from the FNE prior to the expiration of its receive SA bit timer; as such, the subscriber unit determines that there was a loss of granted bandwidth and may initiate corrective actions at this point (step 632), such as requesting bandwidth from the FNE 102 for the two slot assignments it did not receive (step 634) and repeat the process, or fail the current reservation.

Figure 7:
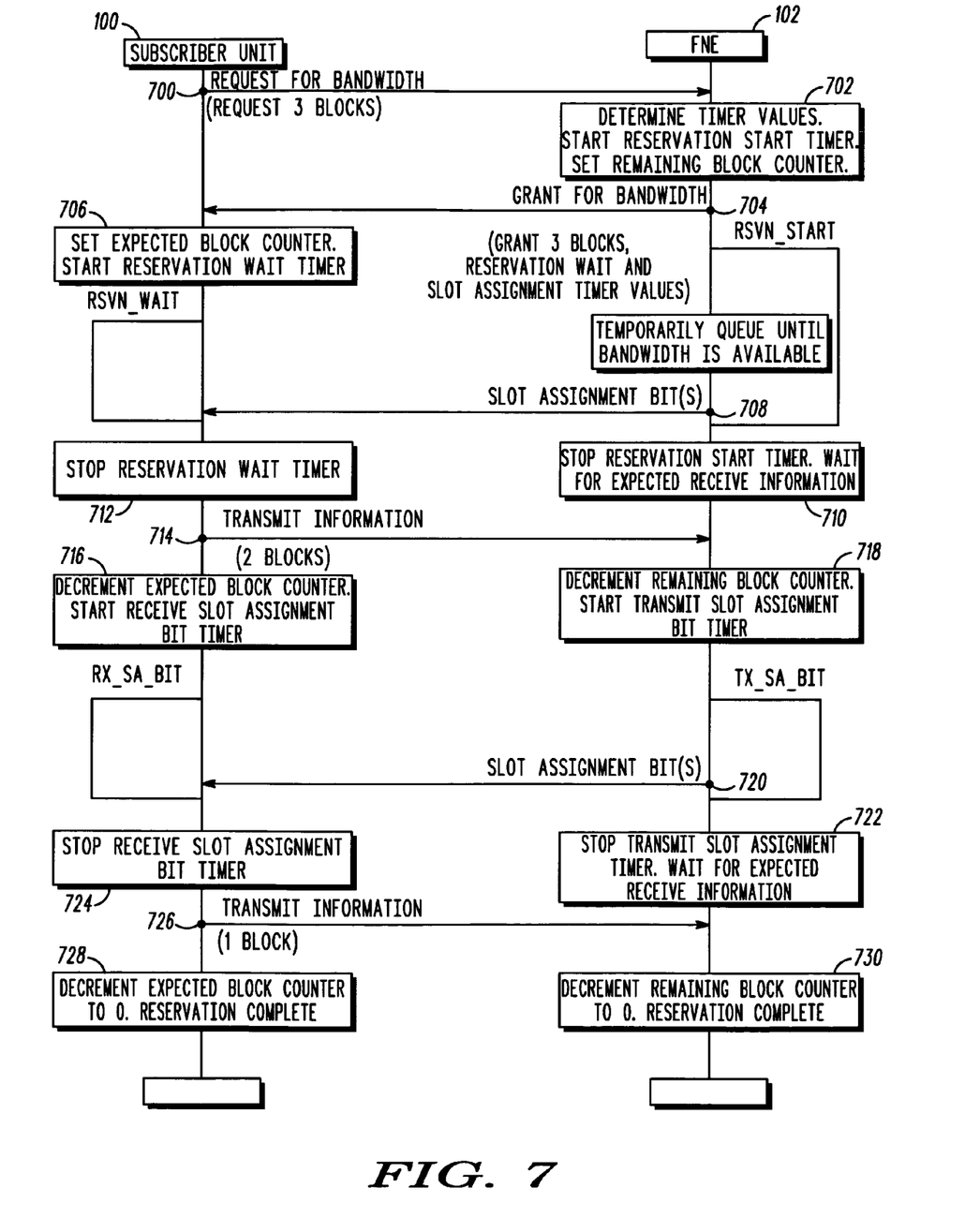
FIG. 7 illustrates a first example of a message flow diagram for a block-based reservation between the subscriber unit and the FNE in accordance with the present invention.

At this point, we have provided examples of the slot-based reservation management operation. Let us now provide two examples of the block-based reservation management operation in accordance with the present invention. Referring to FIG. 7, in this example, the subscriber unit 100 desires to transmit information to the FNE 102, and determines that it needs three blocks to transmit the information in its buffer. As a result, the subscriber unit 100 transmits a bandwidth request to the FNE 102, requesting three blocks (step 700). In this example, upon receipt of the request, the FNE 102 determines that there is a sufficient amount of bandwidth available on the channel to support the request, dynamically determines appropriate timeout timer values and other reservation parameters, starts its reservation start timer and sets it remaining block counter to three (step 702). The FNE 102 transmits a reservation grant to the subscriber unit 100 granting the request and communicating the reservation parameters for the current reservation to be used by the subscriber unit 100 (step 704). Upon receipt of the reservation grant, the subscriber unit 100 sets its expected block counter to three, starts its reservation wait timer based on the value received in the reservation grant (e.g., 200 ms), and waits to receive its first SA bit(s) from the FNE 102 for the current reservation (step 706). It should be noted that, unlike the previous examples, since this example implements block-based reservation, the subscriber unit 100 expects to receive SA bits from the FNE 102 until all the granted blocks have been successfully transmitted to and received by the FNE 102.

In this example, when bandwidth becomes available on the inbound channel, the FNE 102 transmits the first SA bit in the current reservation for the subscriber unit 100 prior to the expiration of its reservation start timer (step 708). Upon transmission of the first SA bit, the FNE 102 stops its reservation start timer, and waits for expected receive information from the subscriber unit 100 (step 710).

Upon receipt of the first SA bit in the current reservation from the FNE 102, the subscriber unit 100 stops its reservation wait timer (step 712), and transmits two blocks of information in the reserved access slot identified from the SA bit (step 714). After the subscriber unit 100 transmits its information in its reserved access slot, the subscriber unit 100 decrements its expected block counter to one, and starts its SA bit timer based on the value received in the reservation grant previously received for the current reservation from the FNE 102 (e.g., 100 ms; step 716). Upon receipt of the two blocks of information from the subscriber unit 100, the FNE 102 decrements its remaining block counter to one, and starts its transmit SA bit timer (step 718).

The FNE 102 then transmits the next SA bit to the subscriber unit 100 prior to the expiration of its transmit SA bit timer (step 720). Once the next SA bit is transmitted, the FNE stops its transmit SA bit timer, and waits for expected receive information from the subscriber unit 100 on the assigned reserved access slot (step 722). Upon receipt of the next SA bit, the subscriber unit 100 stops its receive SA bit timer (step 724), and transmits the remaining block of information in the reserved access slot identified from the SA bit (step 726). Once the subscriber unit 100 transmits its last block of information, the subscriber unit 100 decrements its expected block counter to zero, and concludes that the reservation is complete (step 728). Similarly, once the FNE 102 receives the last block of information from the subscriber unit 100, the FNE 102 decrements its remaining block counter to zero, and also concludes that the reservation is complete (step 730).

Thus, when the subscriber unit 100 and the FNE 102 implement a block-based reservation, the FNE 102 continues to assign slots to the subscriber unit 100 until the FNE 102 has successfully received all requested blocks from the subscriber unit 100. The FNE 102 decrements the remaining block counter for every successfully received block of information from the subscriber unit 100, wherein more than one block of information may be transmitted in a slot. In this example, the subscriber unit 100 transmitted three blocks of information in two slots.

Figure 8:
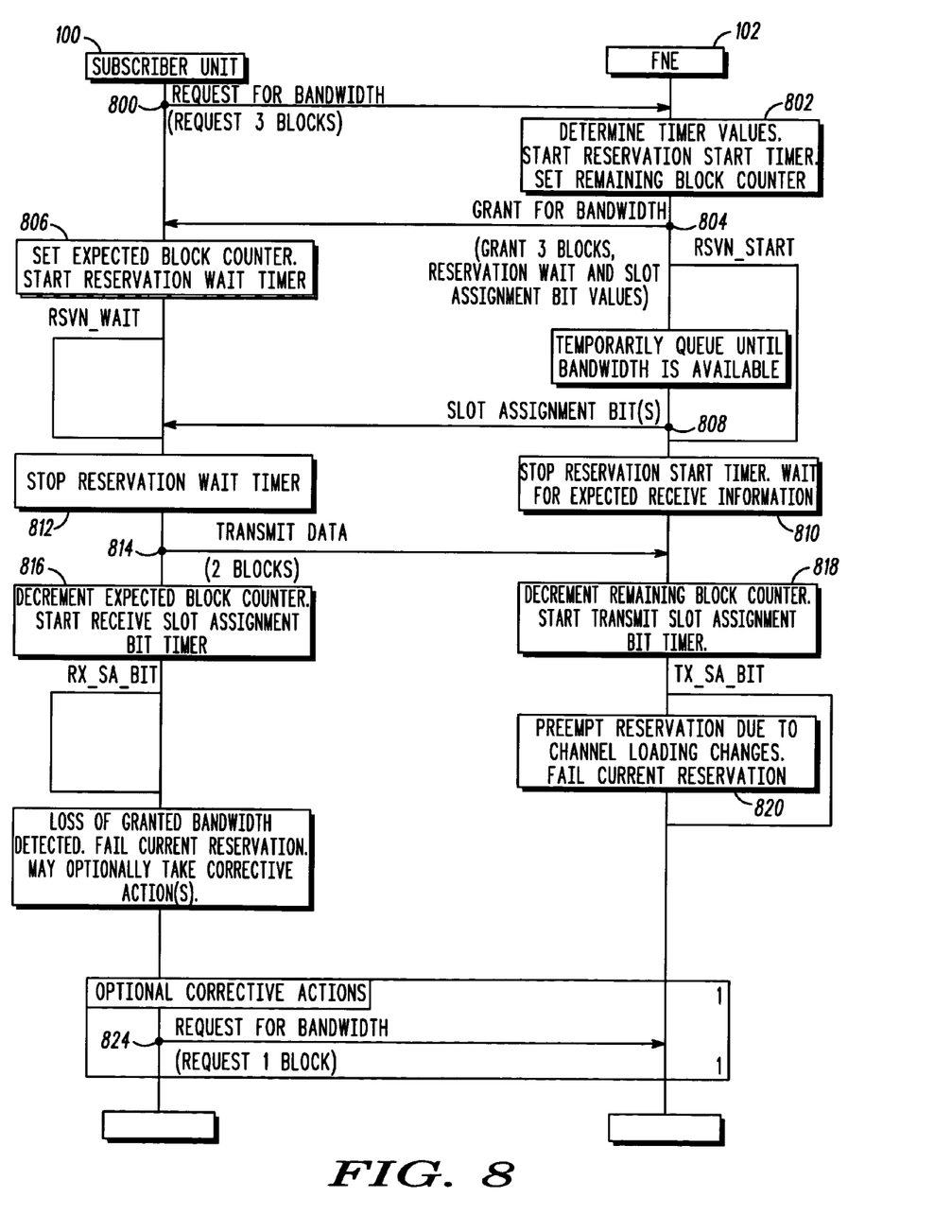
FIG. 8 illustrates a second example of a message flow diagram for a block-based reservation between the subscriber unit and the FNE in accordance with the present invention.

Let us now describe a second example of block-based reservations in accordance with the present invention; in this example, the subscriber unit 100 does not receive all of the granted bandwidth from the FNE 102. As illustrated in FIG. 8, the subscriber unit 100 desires to transmit information to the FNE 102, and determines that it needs three blocks to transmit the information in its buffer. As a result, the subscriber unit 100 transmits a bandwidth request to the FNE 102, requesting three blocks (step 800). Upon receipt of the request, the FNE 102 determines that there is a sufficient amount of bandwidth available on the channel to support the request, dynamically determines appropriate timeout timer values and other reservation parameters, starts its reservation start timer, and sets its remaining block counter to three (step 802). The FNE then transmits a reservation grant to the subscriber unit 100 granting the request and communicating the reservation parameters to be used by the subscriber unit 100 (step 804). Upon receipt of the reservation grant, the subscriber unit 100 sets its expected block counter value to three, starts its reservation wait timer based on the value received in the reservation grant (e.g., 300 ms), and waits to receive its first SA bit(s) in the current reservation from the FNE 102 (step 806).

When the bandwidth becomes available on the inbound channel, the FNE 102 transmits the first SA bit in the current reservation for the subscriber unit 100 prior to the expiration of its reservation start timer (step 808). Upon transmission of the first SA bit, the FNE 102 stops its reservation start timer, and waits for expected receive information from the subscriber unit 100 (step 810).

Upon receipt of the first SA bit from the FNE 102, the subscriber unit 100 stops its reservation wait timer (step 812), and transmits two blocks of information in the reserved access slot identified from the SA bit (step 814). After the subscriber unit 100 transmits the two blocks of information in the reserved access slot, the subscriber unit 100 decrements its expected block counter to one (since it transmitted two blocks of information in the last assigned reserved access slot), and starts its receive SA bit timer based on the value received in the reservation grant previously received for the current reservation from the FNE 102 (e.g., 200 ms; step 816). Upon receipt of the two blocks of information from the subscriber unit 100, the FNE 102 decrements its remaining block counter to one, and starts its transmit SA bit timer (step 818).

In this example, the FNE 102 does not transmit the next SA bit to the subscriber unit 100 prior to the expiration of its transmit SA bit timer because the FNE 102 received a preemptive reservation due to channel loading changes, and fails the current reservation (step 820). As a result, the receive SA bit timer at the subscriber unit 100 expires without the subscriber unit 100 receiving a subsequent SA bit from the FNE 102 to transmit its last block of information. Thus, upon expiration of the receive SA bit timer, the subscriber unit 100 determines that it has detected a loss of granted bandwidth, and either fails the current reservation or takes corrective action (i.e., request bandwidth immediately or after some delay to transmit the remaining block of information; step 822). If the subscriber unit 100 decides to request bandwidth from the FNE 102 in order to transmit the remaining block of information (step 824), the process repeats with the FNE 102 determining whether there is sufficient bandwidth available to support the new request (in this example, one block).

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method comprising the steps of:
   at a subscriber unit:
   determining that there is information to transmit;
   requesting an amount of bandwidth;
   receiving a reservation grant, wherein the reservation grant comprises an amount of granted bandwidth and at least one timer value;
   extracting the at least one timer value from the reservation grant;
   using the at least one timer value to detect loss of granted bandwidth; and
   starting a first timer, wherein the first timer is initialized with the first timer value; and
   when a slot allocation bit is not received prior to the expiration of the first timer,
   determining a loss of granted bandwidth.

2. The method of claim 1 wherein the at least one timer value is dynamically determined by the fixed network equipment based on current conditions.

3. The method of claim 2 wherein the at least one timer value is based on at least one of the following: current loading conditions of an inbound channel, current radio frequency conditions of the inbound channel, a quality of service requested by the subscriber unit, a quality of service assigned to the subscriber unit, a priority level requested by the subscriber unit, and a priority level assigned to the subscriber unit.

4. The method of claim 1 further comprising the steps of, after the step of determining a loss of granted bandwidth:
   failing the reservation grant; and
   transmitting a second request for bandwidth to transmit any remaining information.

5. The method of claim 1 wherein the step of starting the first timer is performed after receiving a first slot allocation bit.

6. The method of claim 5 further comprising the steps of:
   extracting a second timer value from the reservation grant;
   starting a second timer after receiving the reservation grant, wherein the second timer is initialized with the second timer value; and
   if a first slot allocation bit for the granted bandwidth is not received prior to the expiration of the second timer, determining a loss of granted bandwidth.

7. The method of claim 1 further comprising the steps of:
   extracting a value representing an amount of bandwidth granted from the reservation grant; and
   initializing a counter with the value.

8. The method of claim 7 further comprising the step of decrementing the counter after receipt of each slot assignment bit.

9. The method of claim 8 further comprising the step of concluding that the reservation grant is completed when the counter is decremented to zero.

10. A method comprising the steps of:
receiving a request for bandwidth from a first subscriber unit;
determining that the requested bandwidth is available;
dynamically determining at least a first timer value to be used by the first subscriber unit to detect a loss of granted bandwidth;
transmitting a reservation grant to the subscriber unit granting the request, wherein the reservation grant comprises at least the first timer value; and
dynamically determining a second timer value to be used by the first subscriber unit indicating an amount of time the first subscriber unit must wait to receive a first slot assignment bit before the first subscriber unit determines a loss of granted bandwidth.

11. The method of claim 10 wherein the first timer value indicates an amount of time the first subscriber unit must wait to receive at least a second slot assignment bit before the first subscriber unit determines a loss of granted bandwidth.

12. The method of claim 10 wherein the second timer value is based on at least one of the following: current loading conditions of the channel upon receipt of the request for bandwidth, current radio frequency condition of the channel upon receipt of the request for bandwidth, a quality of service requested by the subscriber unit, a quality of service assigned to the subscriber unit, a priority level requested by the subscriber unit, a priority level assigned to the subscriber unit.

13. The method of claim 10 further comprising the steps of:
starting a first timer, wherein the first timer is set to expire after a first amount of time, and wherein the first amount of time is dependent on the second timer value;
if the first slot assignment bit can be assigned to the subscriber unit prior to expiration of the first timer, transmitting the first slot assignment bit to the subscriber unit prior to the expiration of the first timer; otherwise, failing the reservation grant.

14. The method of claim 13 further comprising the steps of:
after the step of transmitting the first slot assignment, starting a second timer, wherein the second timer is set to expire after a second amount of time, and wherein the second amount of time is dependent on the first value; and
if a second slot assignment bit can be assigned to the subscriber unit prior to expiration of the second timer, transmitting the second slot assignment bit to the subscriber unit prior to the expiration of the second timer; otherwise, failing the reservation grant.

15. The method of claim 10 wherein the first timer value is based on at least one of the following: current loading conditions of the channel upon receipt of the request for bandwidth, current radio frequency condition of the channel upon receipt of the request for bandwidth, a quality of service requested by the subscriber unit, a quality of service assigned to the subscriber unit, a priority level requested by the subscriber unit, a priority level assigned to the subscriber unit.

16. The method of claim 10 further comprising the step of allocating inbound slots to the subscriber unit in a non-deterministic fashion.

17. A method comprising the steps of:
receiving a request for bandwidth from a first subscriber unit;
determining that the requested bandwidth is available;
dynamically determining at least a first timer value to be used by the first subscriber unit to detect a loss of granted bandwidth;
transmitting a reservation grant to the subscriber unit granting the request, wherein the reservation grant comprises at least the first timer value;
starting a first timer, wherein the first timer is set to expire after a first amount of time, and wherein the first amount of time is dependent on the first timer value; and
if a slot assignment bit can be assigned to the subscriber unit prior to expiration of the first timer, transmitting a slot assignment bit to the subscriber unit prior to the expiration of the first timer; otherwise, failing the reservation grant.

18. The method of claim 17 further comprising the step of:
receiving a request for bandwidth from a second subscriber unit;
determining that the request for bandwidth from the second subscriber unit preempts the request for bandwidth from the first subscriber unit;
granting the request for bandwidth to the second subscriber; and
failing the reservation grant for the first subscriber unit by failing to transmit a slot assignment bit to the first subscriber prior to expiration of the first timer.

* * * * *